United States Patent
Gerlach

(10) Patent No.: US 10,800,365 B2
(45) Date of Patent: Oct. 13, 2020

(54) METHOD, DEVICE, VEHICLE AND CENTRAL STATION FOR DETERMINING THE ACTUALITY OF A LOCAL USER SETTING

(71) Applicant: VOLKSWAGEN AG, Wolfsburg (DE)

(72) Inventor: Simon Gerlach, Meine (DE)

(73) Assignee: Volkswagen AG, Wolfsburg (DE)

(*) Notice: Subject to any disclaimer, the term of this patent is extended or adjusted under 35 U.S.C. 154(b) by 81 days.

(21) Appl. No.: 15/480,466

(22) Filed: Apr. 6, 2017

(65) Prior Publication Data

US 2017/0291562 A1    Oct. 12, 2017

(30) Foreign Application Priority Data

Apr. 7, 2016 (DE) .......................... 10 2016 205 827

(51) Int. Cl.
*B60R 16/037* (2006.01)
*H04L 29/08* (2006.01)

(52) U.S. Cl.
CPC ............ *B60R 16/037* (2013.01); *H04L 67/02* (2013.01); *H04L 67/12* (2013.01)

(58) Field of Classification Search
CPC ....... B60R 16/037; G06F 17/30; H04L 67/02; H04L 67/12
See application file for complete search history.

(56) References Cited

U.S. PATENT DOCUMENTS

| | | | | |
|---|---|---|---|---|
| 2007/0068717 A1* | 3/2007 | Austin | ................... | B60K 37/02 180/90 |
| 2007/0069880 A1* | 3/2007 | Best | ...................... | B60K 37/02 340/461 |
| 2010/0309933 A1* | 12/2010 | Stark | ................... | G06F 16/2246 370/503 |
| 2011/0191305 A1* | 8/2011 | Nakamura | ............ | G06F 3/0608 707/692 |
| 2011/0227942 A1* | 9/2011 | Fujimoto | ............... | B60K 35/00 345/619 |
| 2013/0086214 A1* | 4/2013 | Jung | ................... | H04L 67/1095 709/217 |
| 2015/0100546 A1* | 4/2015 | Eberlein | ............. | G06F 16/1787 707/610 |

(Continued)

FOREIGN PATENT DOCUMENTS

| | | |
|---|---|---|
| DE | 10026754 A1 | 12/2001 |
| DE | 10345746 A1 | 4/2005 |
| DE | 102009037234 A1 | 2/2011 |

(Continued)

*Primary Examiner* — Hussein Elchanti
(74) *Attorney, Agent, or Firm* — Barnes & Thornburg LLP

(57) ABSTRACT

A method, an apparatus, a vehicle and a control center for establishing an up-to-dateness of a local user setting. The method for a first information system establishes an up-to-dateness of a local user setting and includes determining a first data word based on the local user setting. The first data word is representable with a smaller volume of data than the local user setting. The method also provides the first data word for comparison with a second data word of a second information system. The second data word is based on a remotely stored user setting. The method further establishes the up-to-dateness of the local user setting if the first data word matches the second data word.

20 Claims, 5 Drawing Sheets

(56) References Cited

U.S. PATENT DOCUMENTS

2016/0355193 A1* 12/2016 Chen .................... B60R 16/037

FOREIGN PATENT DOCUMENTS

| DE | 102010029931 A1 | 12/2011 |
| DE | 102012220655 A1 | 5/2013 |
| DE | 102013015737 A1 | 4/2014 |
| DE | 102012024010 A1 | 6/2014 |
| DE | 102013203910 A1 | 9/2014 |
| DE | 102015201448 A1 | 8/2015 |

* cited by examiner

METHOD, DEVICE, VEHICLE AND CENTRAL STATION FOR DETERMINING THE ACTUALITY OF A LOCAL USER SETTING

PRIORITY CLAIM

This patent application claims priority to German Patent Application No. 10 2016 205 827.4, filed 7 Apr. 2016, the disclosure of which is incorporated herein by reference in its entirety.

SUMMARY

Illustrative embodiments relate to a method, an apparatus, a vehicle and a control center for establishing an up-to-dateness of a local user setting, more precisely, but not exclusively, based on a comparison of a first and a second data word, wherein the first data word is representable with a smaller volume of data than the local user setting.

BRIEF DESCRIPTION OF THE DRAWINGS

Further refinements are described in more detail below on the basis of the exemplary embodiments depicted in the drawings, which exemplary embodiments are generally not an overall restriction for exemplary embodiments, however. In the drawings.

DETAILED DESCRIPTION

Figure 1:
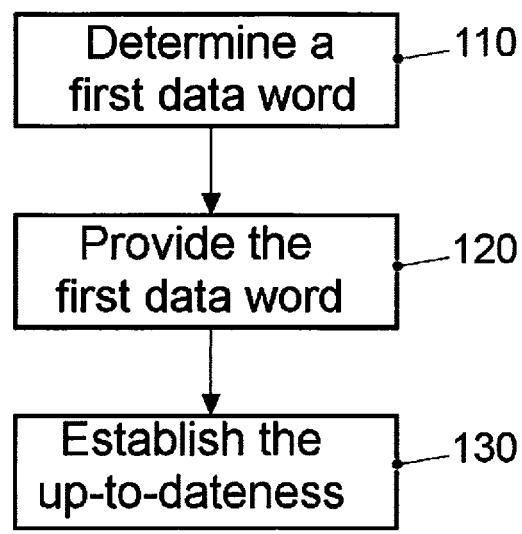
FIG. 1 illustrates a flow chart for an exemplary embodiment of a method for a first information system for establishing an up-to-dateness of a local user setting.

Connection of vehicles to control centers on the Internet is an important trend in vehicle construction. By way of example, it is thus possible to update settings of the vehicle over the Internet, for example, available radio stations or navigation data.

Further, it may be desirable for settings that are used in a vehicle, for example, radio stations, seat position, navigation destinations or the like, to be transmitted between vehicles. In this case, by way of example, settings can be transmitted via a read-only memory, for example, a flash memory, in conventional systems, for example, or files can be stored in a user profile on the Internet and retrieved from the vehicle via an Internet connection. This can be hampered by the fact that an Internet connection of a vehicle may be restricted. By way of example, transmission of large volumes of data via the Internet connection can generate costs for a user or manufacturer of the vehicle, be time-consuming and load or overload a capacity, for example, of wireless mobile communication systems.

There is a need for an improved design for alignment of user settings for a vehicle. This need is met by the presently disclosed method, apparatus, vehicle and control center.

Exemplary embodiments provide a method for establishing an up-to-dateness of a local user setting, for example. In an exemplary embodiment, the method can comprise determining data words on the basis of user settings, for example. The data words, which can correspond to hashes or checksums of the user settings, for example, and can take up a smaller volume of data than the actual user settings, represent the user settings. They can be used to compare these with data words from user setting data words stored remotely, for example, in a control center, to establish an up-to-dateness of the locally stored user settings. If the data words match, then in some exemplary embodiments it is possible for the up-to-dateness of the local user setting to be established, and if they do not match, a comparison of times of last changes, for example, can be used to establish which of the user settings are up to date. If the local or remotely stored user settings are not up to date, then the method can further comprise synchronizing the user settings.

Exemplary embodiments provide a method for a first information system for establishing an up-to-dateness of a local user setting. The method comprises determining a first data word based on the local user setting. The first data word is representable with a smaller volume of data than the local user setting. The method further comprises providing the first data word for comparison with a second data word of a second information system. The second data word is based on a remotely stored user setting. The method further comprises establishing the up-to-dateness of the local user setting if the first data word matches the second data word. In some exemplary embodiments, the second data word is representable with a smaller volume of data than the remotely stored user setting. By way of example, the second data word can be determined similarly to the first data word. By way of example, the second data word can be determined using the same method and the same parameters as the first data word. Using the first and second data words for establishing the up-to-dateness allows a reduction of data transmission capacities, for example, in the case of a comparison of data records having few changes. Use of data words can further, if they have a defined length, allow use of a message format having fixed content sizes, which format, further, can reduce a transmission and processing capacity. Further, the method can allow the up-to-dateness to be established even if a time of the last change is not known, or if timing synchronization is erroneous. By way of example, it is further possible to save data volumes during a synchronization if settings have been altered both locally and remotely in the same way.

The (local or remotely stored) user setting can, in some exemplary embodiments, be representative of a plurality of user settings, for example, user settings of a controller, user settings of a logic controller or user settings of a synchronization group. By way of example, the first data word can be based on the plurality of local user settings, or a plurality of first data words can be determined for the plurality of local user settings.

In some exemplary embodiments, the method can further comprise synchronizing the local user setting to the remotely stored user setting if the first data word does not match the second data word. The synchronizing based on the data words can allow local and remotely stored user settings to be up to date.

In some exemplary embodiments, the method can further comprise determining a time of a last change of the local user setting. By way of example, the determining of the time of the last change of the local user setting can correspond to determining a time of a last change of a user setting from a plurality of user settings that are represented by the first data word. The synchronizing can be based on a comparison of the time of the last change of the local user setting with a time of a last change of the remotely stored user setting. By way of example, the synchronizing can comprise providing the time of the last change of the local user setting for the second information system. Alternatively or additionally, the synchronizing can comprise obtaining the time of the last change of the remotely stored user setting. If the time of the last change of the local user setting is later than the time of the last change of the remotely stored user setting, then the synchronizing can comprise providing the local user setting for the second information system and/or obtaining the remotely stored user setting if the time of the last change of the local user setting is earlier than the time of the last change of the remotely stored user setting. The determining of the time of the last change allows determining of which of the user settings can be updated.

In at least some exemplary embodiments, the determining of the first data word can comprise determining a mapping of the local user setting or of the plurality of user settings into a target space. The first data word may be comprised in the target space. Alternatively or additionally, the determining of the first data word can comprise computing a hash function using the local user setting or the plurality of local user settings. The data word can comprise a result of the computed hash function. Alternatively or additionally, the determining of the first data word can comprise computing a checksum using the local user setting or the plurality of local user settings. The first data word can comprise the checksum. The determining of the first data word on the basis of a mapping, based on a hash or as a checksum, can allow determination of a data word, having a fixed bit length and/or having a smaller volume of data than the user setting.

In some exemplary embodiments, the providing can comprise providing the first data word for the second information system. The establishing can further comprise obtaining a result of a comparison of the first data word and of the second data word from the second information system. The providing of the first data word for the second information system allows the comparison by the second information system, the computation capacities of which may be greater than those of the first information system.

In some exemplary embodiments, the establishing can further comprise obtaining the second data word from the second information system. The establishing can further comprise comparing the first data word with the second data word. The obtaining of the second data word from the second information system allows the local comparison of the data words, which can reduce use of the computation capacities of the second information system.

In some exemplary embodiments, the method can further comprise obtaining information about supported user settings from the second information system. The providing of the first data word can further be based on the information about the supported user settings. This can reduce a required transmission capacity, for example, because unsupported user settings are not transmitted. In some exemplary embodiments, the information about the supported user settings can be buffer-stored by the second information system or can be derived from a property of the first or second information system.

In some exemplary embodiments, the method can further comprise determining information about supported user settings. The method can further comprise providing the information about the supported user settings for the second information system. The providing of the information about the supported user settings can reduce a required transmission capacity for data messages of the second information system, for example, because unsupported user settings are not transmitted.

The information about the supported user settings can, in some exemplary embodiments, indicate which user settings have been incorporated during the formation of the respective data word. In this way, the first information system and the second information system can use the same method for the respectively available values of the same user settings for determining the first data word and the second data word. As a result, the two data words are, in at least one exemplary embodiment, comparable—which can be a prerequisite for subsequent synchronization.

In some exemplary embodiments, the first information system can correspond to an information system of a vehicle. The vehicle can comprise at least one controller, for example. The at least one controller can comprise one or more local user settings. The method can further comprise obtaining information about a change of the local user setting from the at least one controller. In some exemplary embodiments, the information about the change can comprise information about a change of one or more user settings. The method can further comprise obtaining the local user setting from the at least one controller if the information about the change of the local user setting indicates that the local user setting has been changed. By way of example, the obtaining of the local user setting can comprise obtaining the plurality of user settings on which the determining of the first data word is based. The method can further comprise providing the synchronized local user setting for the at least one controller. The determining of the first data word, the providing of the first data word and/or the establishing of the up-to-dateness can be based on the information about the change of the local user setting. The aggregating of the user settings for establishing the up-to-dateness can allow use of a central controller for establishing and can make it unnecessary to keep redundant functionality in the controllers. Using the information about the change of the local user setting can, further, simplify the comparison, since the providing or establishing can be performed only in the case of a local change, for example. In addition, on obtaining the information about the change, the current time can be stored and used as the time of the last change for determining the transmission direction for the synchronization.

Exemplary embodiments further provide a program having a program code for performing at least the method when the program code is executed on a computer, a processor, a control module or a programmable hardware component.

Exemplary embodiments further provide an apparatus for a first information system, for establishing up-to-dateness of a local user setting. The apparatus comprises a control module. The control module is designed for determining a first data word based on the local user setting. The first data word is representable with a smaller volume of data than the local user setting. The control module is further designed for providing the first data word for comparison with a second data word of a second information system. The second data word is based on a remotely stored user setting. The control module is further designed for establishing the up-to-dateness of the local user setting if the first data word matches the second data word.

Exemplary embodiments further provide a vehicle comprising the apparatus and the first information system. The first information system can correspond to an information system of the vehicle. The second information system can correspond to an information system of a control center. The apparatus can be used to compare the local user settings of the vehicle with remotely stored user settings of a control center, for example, a server.

Exemplary embodiments further provide a control center comprising the apparatus and the first information system. The first information system can correspond to an information system of the control center. The second information system can correspond to an information system of a vehicle. The apparatus can be used to compare the local user settings that are stored in the control center with remotely stored user settings of a vehicle.

Exemplary embodiments further provide a system having the vehicle and the control center, comprising the first information system and the second information system and the apparatus.

Various exemplary embodiments will now be described more comprehensively with reference to the accompanying drawings, which depict some exemplary embodiments. In the figures, the thickness dimensions of lines, layers and/or regions may be illustrated in an exaggerated state for the sake of clarity.

In the following description of the enclosed figures, which merely show some exemplary embodiments by way of example, like reference symbols may denote like or comparable components. Further, combinatory reference symbols can be used for components and objects that occur repeatedly in at least one exemplary embodiment or in a drawing, but are described jointly with regard to one or more features. With regard to individual, multiple or all features, for example, their dimensionings, components or objects that are described using like or combinatory reference symbols can be embodied in the same way, but if appropriate also differently, unless explicitly or implicitly revealed otherwise by the description.

Although exemplary embodiments can be modified and altered in various ways, exemplary embodiments are depicted as examples in the figures and are described comprehensively herein. However, it should be clarified that there is no intention to restrict exemplary embodiments to the forms respectively disclosed, rather that exemplary embodiments are intended to cover all functional and/or structural modifications, equivalents and alternatives that lie within the scope of the disclosed embodiments. Like reference symbols denote like or similar elements in the entire description of the figures.

It is noted that one element denoted as "connected" or "coupled" to another element can be directly connected or coupled to the other element or that intervening elements can be present. By contrast, if one element is denoted as "directly connected" or "directly coupled" to another element, then no intervening elements are present. Other terms used to describe the relationship between elements should be interpreted in a similar way (e.g., "between" vis-à-vis "directly therebetween", "adjacent" vis-à-vis "directly adjacent", etc.).

The terminology used herein serves only to describe specific exemplary embodiments and is not intended to restrict the exemplary embodiments. As used herein, the singular forms "a" and "the" are also intended to include the plural forms, unless clearly indicated otherwise by the context. Further, it should be clarified that the expressions such as, e.g., "includes", "including", "has", "comprises", "comprising" and/or "having", as used herein, indicate the presence of stated features, whole numbers, operations, work sequences, elements and/or components, but do not rule out the presence or the addition of one or more features, whole numbers, operations, work sequences, elements, components and/or groups thereof.

Unless defined otherwise, all terms used herein (including technical and scientific terms) have the same meaning that is ascribed to them by a person of average skill in the art in the field to which the exemplary embodiments belong. Further, it should be clarified that expressions, e.g., those defined in generally used dictionaries, should be interpreted as if they have the meaning consistent with their meaning in the context of the relevant art, and should not be interpreted in an idealized or excessively formal sense, as long as this is not expressly defined herein.

Increasingly more vehicles provide the option of choosing between multiple sets of settings, for example, for different users. For many use scenarios, it may be useful for the settings of a user (what is known as the profile) to be able to be taken along to other vehicles (e.g., when the same person uses multiple vehicles or when a vehicle is purchased, rentals are used, etc.). In this regard, it is conceivable for profiles to be stored in an online service and retrieved therefrom. It is also conceivable for a profile that has already been loaded in a vehicle previously to be aligned with a profile in the backend (for example, (constantly) automatically or at least at the request of the user).

At least some exemplary embodiments can meet the following demands, for example:

For convenient use, the synchronization of the profiles to a control center (also backend, for example, a control center from FIGS. 4 and 5) can be performed in a short time. Further, it may be an aim to keep down costs for transmission of the data by keeping down the required volume of data.

There are a multiplicity of different vehicle configurations with different equipment, country-dependent function definitions, different software and hardware versions of controllers, etc. All of these embodiments can support different sets of settings in some cases. In some exemplary embodiments, by way of example, it is possible to transmit to the vehicle, for example, the vehicle 1000 from FIGS. 4 and 5, the settings that are also supported by the vehicle.

In some exemplary embodiments, the user settings can be transmitted within the vehicle from a central controller with access to the control center to the controllers in which the function that uses these user settings is performed.

Conventional systems use upload and download of a complete set of settings from/to the vehicle from the Internet and/or at least partial synchronization of the user settings via a mobile phone, for example. These systems frequently provide no concepts for reducing the volume of data and for shortening the synchronization time.

Figure 1A:
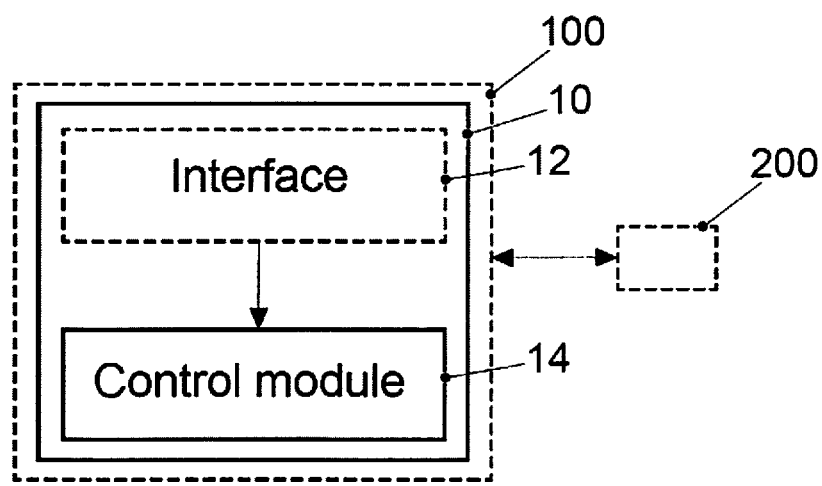
FIG. 1a illustrates a block diagram of an exemplary embodiment of an apparatus for a first information system for establishing an up-to-dateness of a local user setting.

FIG. 1 illustrates a flow chart for an exemplary embodiment of a method for a first information system 100, for establishing an up-to-dateness of a local user setting. FIG. 1a illustrates a block diagram of an exemplary embodiment of an apparatus 10 for the first information system 100, designed for carrying out the method. The apparatus comprises a control module 14, designed for carrying out the method operations. The up-to-dateness of the local user setting can indicate whether the local user setting corresponds to a remotely stored user setting, for example, or a time of the last change of the local user setting is later than a time of the last change of the remotely stored user setting.

In exemplary embodiments, the control module 14 can correspond to an arbitrary controller or processor or a programmable hardware component. By way of example, the control module 14 may also be realized as software that is programmed for an applicable hardware component. In this respect, the control module 14 may be implemented as programmable hardware with accordingly adapted software. In this case, any processors, such as digital signal processors (DSPs), can be used. Exemplary embodiments are not limited to one particular type of processor in this case. Any processors or multiple processors are conceivable for implementing the control module 14.

Figure 4:
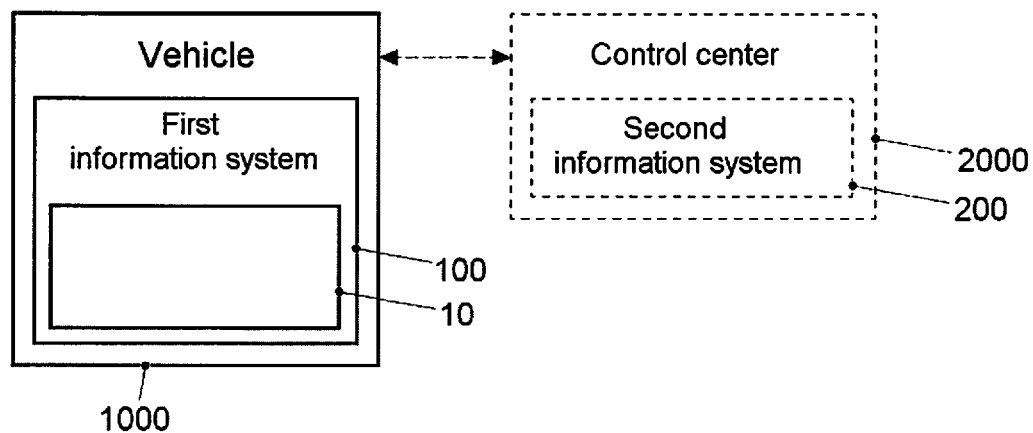
FIG. 4 illustrates a block diagram of an exemplary embodiment of a vehicle comprising a first information system and an apparatus.

In some exemplary embodiments, the first information system can, by way of example, correspond to an information system of a vehicle, for example, to a central controller of the vehicle 1000. FIG. 4 illustrates a block diagram of an exemplary embodiment of a vehicle 1000 comprising the apparatus 10 and the first information system 100. The first information system can comprise the apparatus 10, for example. The second information system 200 can correspond to an information system of a control center 2000, for example. The control center 2000 can correspond to a server, a backend, a computer center or a computation entity, for example, and be comprised thereby.

Figure 5:
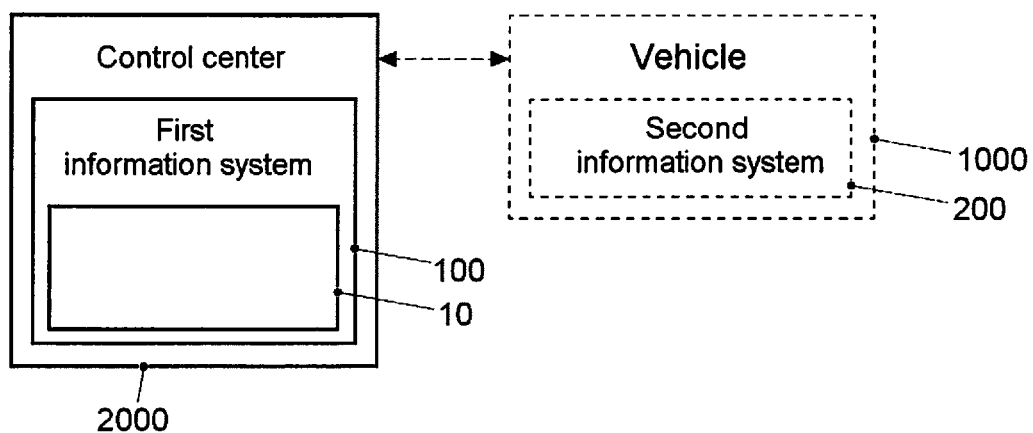
FIG. 5 illustrates a block diagram of an exemplary embodiment of a control center comprising a first information system and an apparatus.

Alternatively, the information system 100 can correspond to an information system of a control center 2000. FIG. 5 illustrates a block diagram of an exemplary embodiment of a control center 2000 comprising the apparatus 10 and the first information system 100. The second information system 200 can in this case correspond to an information system of a vehicle 1000 and be comprised thereby.

In at least some exemplary embodiments, the vehicle 1000 could correspond to a land vehicle, a watercraft, an aircraft, a rail vehicle, a road vehicle, an automobile, an all-terrain vehicle, a motor vehicle or a truck, for example.

The method comprises determining 110 a first data word based on the local user setting. The first data word is representable with a smaller volume of data than the local user setting. By way of example, the first data word can represent the local user setting, but cannot correspond thereto. In some exemplary embodiments, the content of the local user setting is not derivable from the first data word. By way of example, the first data word cannot, in some exemplary embodiments, correspond to a compressed version of the local user setting. By way of example, the first data word may be designed to represent the local user setting such that a match in a comparison of the first data word with a second data word, with an at least sufficiently high probability, reveals that a user setting that is represented by the second data word matches the local user setting.

In some exemplary embodiments, the determining 110 of the first data word can comprise determining a mapping of the local user setting into a target space. By way of example, the first data word may be comprised in the target space. By way of example, the target space can comprise a target space of a transformation function. In some exemplary embodiments, elements of the target space can have a stipulated number of bits.

Alternatively or additionally, the determining of the first data word can comprise computing a hash function using the local user setting. The data word can comprise a result of the computed hash function or correspond thereto. By way of example, the hash function can also correspond to a hash algorithm, for example, an SHA256 method (Secure Hash Algorithm 256).

Alternatively or additionally, the determining 110 of the first data word can comprise computing a checksum using the local user setting. The first data word can comprise the checksum, for example.

The method further comprises providing 120 the first data word for comparison with a second data word of a second information system 200. The second data word is based on a remotely stored user setting. In at least one exemplary embodiment, the second data word can be determined in the same way as or similarly to the first data word, for example, based on the same mapping or based on the same algorithm. In some exemplary embodiments, the determining 110 can further comprise determining information about a method used for determining the first data word. By way of example, the information about the method used for determining the first data word can comprise information about a mapping method used and parameters of the mapping method, for example, information about a hash method used and information about the hash method used. The determining 110 may further be based on the information about the method used, for example, the method can be used to determine 110 the first data word.

In some exemplary embodiments, the first data word may be representative of a first plurality of data words based on a plurality of local user settings, for example. The second data word may be representative of a second plurality of data words based on a plurality of remotely stored user settings, for example. By way of example, the first data word can be determined for a group of user settings that are combined in a controller, in a logic controller or a synchronization group. The terms local user setting and remotely stored user setting can be used relatively, for example, based on whether the method is performed in the information system of a vehicle 1000 or in the information system of a control center 2000. By way of example, in some exemplary embodiments, the remotely stored user setting can correspond to a user setting stored centrally in the control center 2000, for example, comprised in a profile or user profile.

Figure 1B:
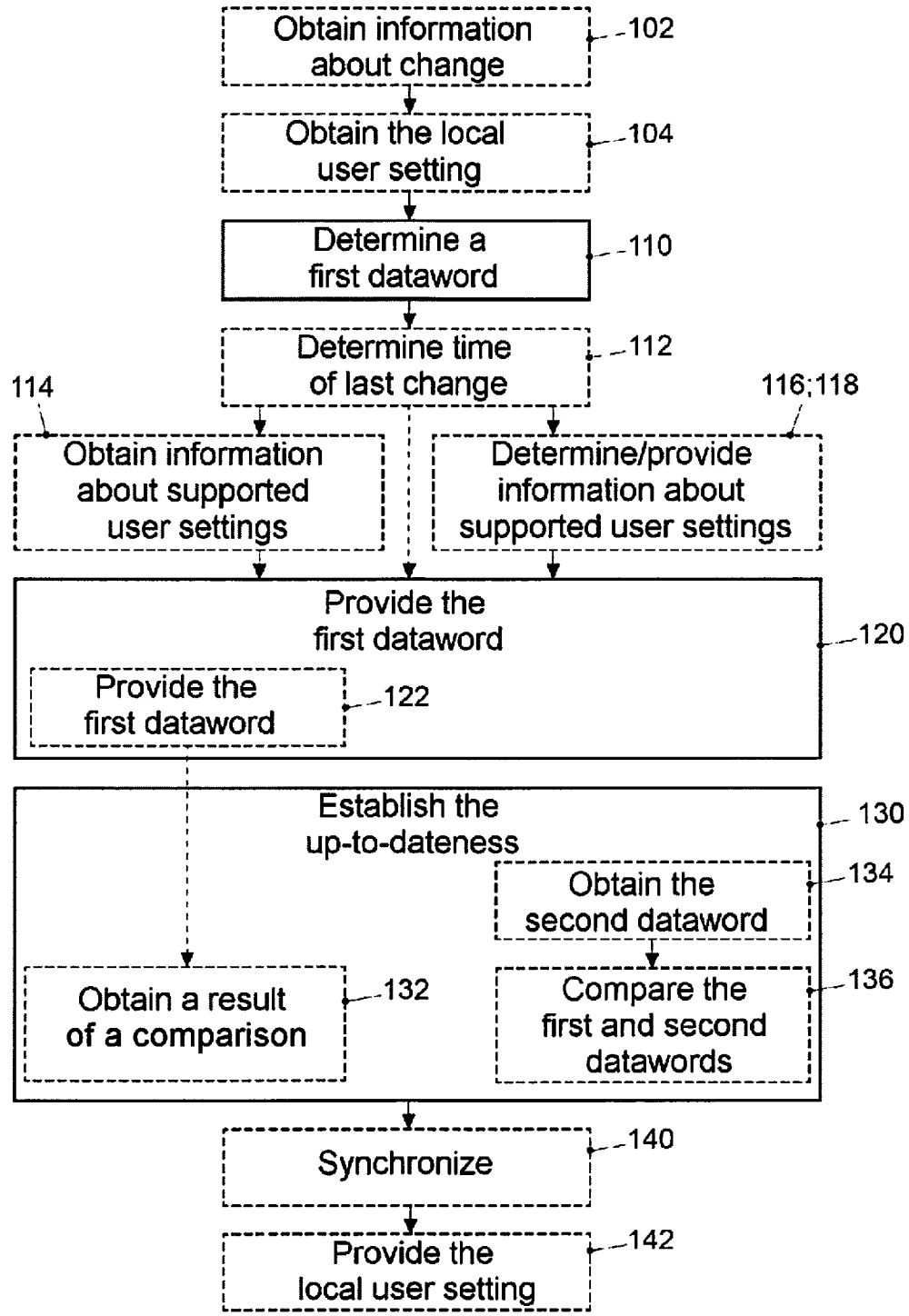
FIG. 1b illustrates a flow chart for a further exemplary embodiment of a method for a first information system for establishing an up-to-dateness of a local user setting.

By way of example, the providing 120, as shown in FIG. 1*b*, can comprise providing 122 the first data word for the second information system 200. By way of example, the control module 14 may be designed to provide the first data word via an interface 12 for the second information system 200. The interface 12 can, by way of example, correspond to one or more inputs and/or one or more outputs for receiving and/or transmitting information, for example, in digital bit values, based on a code, within a module, between modules, or between modules of different entities. By way of example, the interface 12 can correspond to a network interface and/or a mobile radio interface. The network, for example, the Internet or a proprietary network, can communicate at least to some extent via a mobile radio system, for example.

The providing 122 can further comprise providing the information about the method used for determining the first data word for the second information system. By way of example, the second information system may be designed to determine the second data word based on the information about the method used for determining the first data word.

Exemplary embodiments can therefore make use of a transceiver/mobile radio that is designed for communicating data via the mobile radio system with a server or computer or another communication partner that can be reached via the Internet or the World Wide Web (WWW) or another network, for example. The mobile radio system can, by way of example, correspond to one of the mobile radio systems that are standardized by applicable standardization committees, such as, e.g., the 3rd Generation Partnership Project (3GPP) group. By way of example, these comprise the Global System for Mobile Communications (GSM), Enhanced Data Rates for GSM Evolution (EDGE), GSM EDGE Radio Access Network (GERAN), the Universal Terrestrial Radio Access Network (UTRAN) or the Evolved UTRAN (E-UTRAN), such as, e.g., the Universal Mobile Telecommunication System (UMTS), Long Term Evolution (LTE) or LTE-Advanced (LTE-A), or mobile radio systems of other standards, such as, e.g., the Worldwide Interoperability for Microwave Access (WIMAX), IEEE802.16 or Wireless Local Area Network (WLAN), IEEE802.11, and also generally a system that is based on a Time-Division Multiple Access (TDMA) method, Frequency-Division Multiple Access (FDMA) method, Code Division Multiple Access (CDMA) method, Orthogonal Frequency Division Multiple Access (OFDMA) method or another technology or multiple access method. In the text below, the terms mobile radio system, mobile radio network and mobile communication system are used synonymously.

The method further comprises establishing 130 the up-to-dateness of the local user setting if the first data word matches the second data word. If the first and second data words do not match, then the up-to-dateness cannot be established 130 in some exemplary embodiments; however, in some exemplary embodiments, this does not mean that the local user setting is not up to date. By way of example, the establishing 130 can be based on a bit-by-bit comparison of the first data word and the second data word. Alternatively or additionally, the establishing 130 can be based on processing of the first data word based on the second data word by a function, for example, by an algebraic function.

The establishing 130 can further comprise obtaining 132 a result of a comparison of the first data word and the second data word from the second information system 200, for example, by the control module 14 via the interface 12 via the network. The establishing 130 can further be based on the result of the comparison. By way of example, the result can indicate that the first data word and the second data word match, which can indicate that the local user setting matches the remotely stored user setting. If the result indicates that the first data word and the second data word match, then the establishing 130 can establish the up-to-dateness of the local user setting, for example.

Alternatively, the establishing 130 can further comprise obtaining 134 the second data word from the second information system 200, for example, by the control module 14 via the interface 12 and the network. The establishing 130 can further comprise comparing 136 the first data word with the second data word. The comparing 136 can, by way of example, check whether a bit sequence of the first data word matches a bit sequence of the second data word. The establishing 130 can establish an up-to-dateness of the local user setting if the first and second data words match. By way of example, the method can further comprise obtaining information about the method used for determining the second data word from the second information system. The determining 110 of the first data word can, by way of example, be based on the information about the method used for determining the second data word. By way of example, the method for determining the first data word can be based on the method for determining the second data word or correspond thereto.

By way of example, the method can further comprise determining 112 a time of a last change of the local user setting. The establishing 130 can further be based on the time of the last change of the local user setting. By way of example, the establishing 130 can further comprise providing the time of the last change for the second information system 200 for a comparison with a last change of the remotely stored user setting, and obtaining a result of the comparison that indicates whether the remotely stored user setting or the local user setting is more up to date. Alternatively, the establishing 130 can further comprise obtaining a time of the last change of the remotely stored user setting, and the establishing 130 can comprise comparing the time of the last change of the local user setting and the time of the last change of the remotely stored user setting to establish the up-to-dateness of the local user setting if the first data word and the second data word differ and the time of the last change of the local user setting is later than the time of the last change of the remotely stored user setting.

In some exemplary embodiments, the method can further comprise synchronizing 140 the local user setting to the remotely stored user setting if the first data word does not match the second data word. By way of example, the synchronizing 140 can further be based on a comparison of the time of the last change of the local user setting with the time of the last change of the remotely stored user setting. Alternatively or additionally, the synchronizing 140 can further be based on a time of a last successful synchronization. By way of example, the direction of the synchronization can be based on a comparison of the time of the last successful synchronization and the time of the last change of the remotely stored user setting. If the local user setting is up to date, then the local user setting can be provided, for example, as a data packet, to the second information system 200. By way of example, the local user setting can also be provided to the second information system 200 in a manner comprised in one or more data packets that comprise one or more local user settings.

In some exemplary embodiments, the method, as shown in FIG. 1b, can further comprise obtaining 114 information about supported user settings from the second information system 200. The information about the supported user settings can, by way of example, indicate and/or be based on which user settings can be used by the second information system 200. By way of example, the user settings can correspond to user settings of a vehicle, for example, the vehicle 1000. Different vehicles can, by way of example, support different user settings, for example, because certain capabilities are available only in a subset of vehicles. The information about the supported user settings can indicate which subset of user settings is supported by the vehicle for whose second information system the information about the supported user settings is obtained 114. Consequently, the determining 110 of the first data word and/or the second data word can further be based on the information about the supported user settings, i.e., the data words can be based on the user settings that are supported or can be synchronized by the vehicle. The providing 120 can further be based on the information about the supported user settings. The determining 110 and the providing 120 can, by way of example, determine and provide the first data word if the information about the supported user settings indicates that the applicable local user setting is supported by the second information system 200. By way of example, the method can further comprise buffer-storing, for example, by means of the control module 14 and a memory, the information about the supported user settings, or deriving the information about the supported user settings, for example, based on a property or a use of the first and/or second information system. The information about the supported user settings can, by way of example, indicate which user settings are to be incorporated into the respective hash formation. It is conceivable that multiple such data words are formed to describe respective portions of all of the vehicle settings, for example, for the settings of each controller or synchronization groups of user settings. The user settings supported by the vehicle (or the backend) are, in some exemplary embodiments, the total set of all of these settings of the individual data words (and possibly more, if some user settings are not meant to be synchronized at all).

In some exemplary embodiments, the method can further comprise determining 116 information about supported user settings. The determining 116 can, by way of example, be based on a database or data source with supported functions or user settings of a vehicle whose information system is designed to carry out the method. By way of example, the determining 116 can further request controllers of the vehicle and obtain information about user settings supported by the controllers and determine the information about the supported user settings based on the information obtained from the controllers. The method can further comprise providing 118 the information about the supported user setting for the second information system, for example, by the control module 14 via the interface 12 via the network. By way of example, the information about the supported user setting can be provided together with the information about the method used for determining the first data word.

In at least one exemplary embodiment by way of example, the first information system 100 corresponds to an information system of a vehicle. The vehicle of the exemplary embodiment by way of example comprises at least one controller 50. The at least one controller comprises one or more local user settings.

The method can comprise, by way of example, obtaining 102 information about a change of the local user setting from the at least one controller 50. The information about the change can, by way of example, indicate whether a and/or which local user setting of the at least one controller 50 has been changed.

The method can comprise, by way of example, obtaining 104 the local user setting from the at least one controller 50. The obtaining 104 can, by way of example, be performed if the information about the change of the local user setting indicates that the local user setting has been changed. By way of example, the method can further comprise buffer-storing the local user setting, for example, by means of the control module 14 and a memory, which can avoid fresh retrieval of the unaltered local user setting.

The method can further comprise providing 142 the synchronized local user setting for the at least one controller 50, for example, if the local user setting was not up to date and has been changed by the synchronizing 140. In some exemplary embodiments, the determining 110, the providing 120 and/or the establishing 130 can be based on the information about the change of the local user setting. By way of example, in some exemplary embodiments, the first data word can be determined 110 and provided 120 if the local user setting has been changed. By way of example, the first data word can be buffer-stored by the second information system 200 in this case and used for a fresh comparison, for example, together with the information about the supported user setting and the information about the method used for determining the data word.

In at least some exemplary embodiments, the local user settings may be comprised in at least one controller (SG), for example, the at least one controller 50. By way of example, the user settings of a controller can be combined into a group that comprises the user settings in a defined structure/format. This defined structure/format can be used to form the data words, for example, as hashes.

Further, the method can transmit an identification (ID) for the personalizable settings of the SGs of the vehicle, for example, for the vehicle 1000, (but not the specific values of the settings) to the backend (for example, to the second information system 200), for example, as information about supported user settings of the vehicle. The backend may be designed to retrieve the respective user settings for the IDs of the SGs in a user profile in the backend (this profile can, by way of example, contain more settings for which no IDs have been sent, because the setting is not supported by this vehicle). Analogously to the vehicle, groups of the settings of an SG can be formed using the same structure/format and this can be used to determine data words/hashes.

In some exemplary embodiments, the hashes ascertained in the backend and in the vehicle can be compared with one another per SG in the establishing 130. If a discrepancy arises between the hashes in the case of one SG, then a comparison of times of last changes (last synchronization of the vehicle and last write access to profile in the backend) can determine the direction in which the user settings for these SGs need to be transmitted for the synchronizing 140. Alternatively or additionally, a last change of the settings involved in the hash formation (identifiable from receipt of the information about the change from the applicable SG) and a last write access to one of the settings involved in the hash formation can be used in the backend to ascertain the direction of synchronization without performing conflict detection, for example.

In some exemplary embodiments, it is possible, by way of example, for synchronization conflicts to be detected if the time of the last change of the remotely stored user settings in the backend is more recent than in the vehicle and additionally the information about the change of the user settings indicates a change. This information can, by way of example, be set if a user setting has been altered after the last synchronizing. The conflicts can then be handled in a suitable manner.

Exemplary embodiments may be designed, by way of example, to perform automatic identification of alterations between the set of settings in the vehicle and the relevant entries of a set of settings in the backend.

Logic controllers (LSGs, sometimes also called ATNs, for example, the at least one controller 50), that comprise personalizable user settings that can be aligned with the backend are addressable using logical addresses (what are known as LSG-IDs) in an exemplary embodiment by way of example, regardless of the physical positioning in the vehicle. For every single personalizable user setting in the LSGs, it is possible to define a descriptor that is explicit per LSG-ID or a globally explicit descriptor (what is known as a key), for example.

Figure 2:
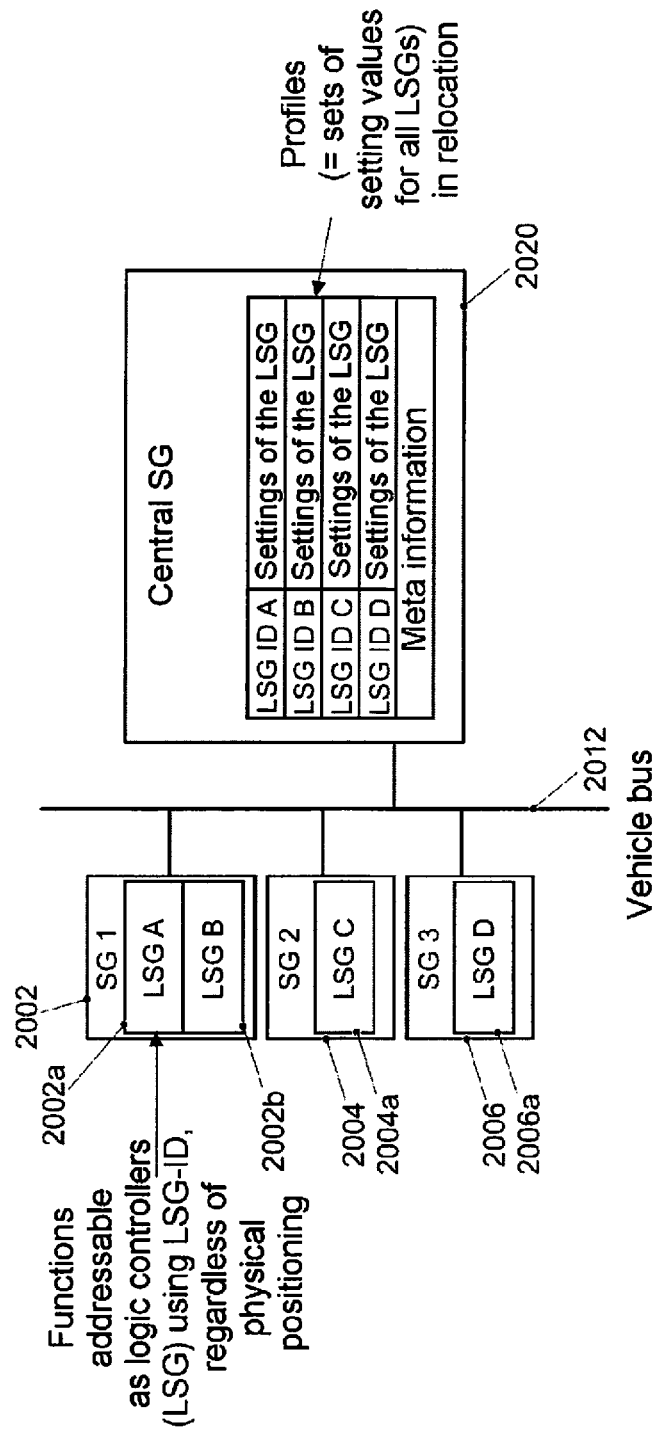
FIG. 2 illustrates an exemplary embodiment by way of example of networking of controllers in a vehicle with a central controller.

FIG. 2 shows an exemplary embodiment by way of example. A central controller, for example, the control module 14 of the apparatus 10, may be designed to perform the synchronization of the settings. The central controller can use the vehicle bus, for example, the CAN-BUS or a LIN, to communicate with the LSGs. FIG. 2 shows an exemplary system with the controllers 2002, 2004 and 2006 and the logic controllers 2002a, 2002b, 2004a and 2006a, the communication bus 2010 and the central controller 2020 that comprises the user settings. The controllers 2002; 2004 and 2006 and/or the logic controllers 2002a, 2002b, 2004a and 2006 may be comprised in the plurality of controllers, for example. The central controller 2020 can, in some exemplary embodiments, correspond to or comprise the apparatus 10.

The central SG 2020 may, by way of example, be designed to communicate with the LSGs 2002a, 2002b, 2004a and 2006a via the vehicle bus 2010 as follows:

By way of example, the central SG 2020 may be designed to retrieve a list of the keys supported by the LSG, and to take this as a basis for determining the information about the supported user settings of the vehicle, for example. The central SG 2020 can, by way of example, request and locally store, at a given time (e.g., as a one off when the vehicle starts or after identification of a hardware or software change, no later than before synchronization), the list of keys supported per LSG.

Further, the central SG 2020 may be designed to retrieve a list or other data structure of the personalizable user settings (local user settings) from the LSGs, for example, through a data export functionality. A dirty flag that can indicate that there is a changed user setting in the controller that can be retrieved from the central SG 2020, and that is comprised in the information about the change of user settings, for example, can be erased following successful export. This makes it possible to dispense with a notification about a change of user settings (what is known as a dirty notification), for example.

Further, the central SG 2020 may be designed to send a list or other data structure of the personalizable user settings (local user settings) to the LSG to import it therein. This may be implemented, by way of example, by a data import functionality, which loads the user settings in a temporary import buffer, and a functionality for adopting the user settings. Following the import, the dirty flag can be erased, for example, and/or a dirty notification can be provided. Once the user settings have been imported, they can be activated.

The LSGs may be designed to automatically send a notification (dirty notification, in the sense of notification about a change) to the central SG 2020 after a change of personalizable settings in the LSG (for example, without citing this change more precisely), for example, as information about a change of the user settings.

On receiving a dirty notification from an LSG, the central SG 2020 may be designed to:
- store the reception of the dirty notification from the LSG
- erase a global synchronization flag (signaler, alternatively as a dirty flag with inverse logic)
- store the current time or increment a counter
- set a countdown timer to a particular value (e.g., 2 minutes) and start Alternatively, it is also possible for the current time of the last change to be stored per LSG (instead of globally), for example, which allows more finely granular synchronization. It is also possible to dispense with the global synchronization flag if need be when no conflict detection is demanded and instead the times of the last changes are compared.

The synchronization flag can, by way of example, indicate whether one of the local user settings has been changed since the last synchronization. A set synchronization flag can, by way of example, indicate that a change has not been performed, and an erased flag can indicate that at least one local user setting exists that has been changed at least once.

From the point of view of the SGs, the dirty flag can, by way of example, indicate that changes to the current settings have taken place in a slot since the last successful import into or export from this slot. If the settings made since this time have been reversed again by further settings, then the dirty flag can still remain set in some exemplary embodiments.

Changes to the dirty flag can be propagated by the SGs, so that one dirty flag per LSG can likewise be kept in the profile management. From the point of view of the profile management, the dirty flag can indicate whether the copy obtained by it through import/export corresponds to the actual content of the slot in the SG. By way of example, the central SG 2020 can use a vehicle bus to request (for example, as a broadcast) which LSGs have dirty flags set for them, and to obtain these as a dirty notification from the LSGs as a response to the request, for example. Alternatively or additionally, the LSGs may be designed to provide a dirty notification automatically in the event of a change to the user settings.

The dirty notification can, in some exemplary embodiments, be sent not directly after the change, but can also occur with a slight delay after user action, to reduce the number of messages in the event of a quick succession of user actions. The delay can remain below an upper limit of approximately 2 s, for example.

The LSGs may further be designed to export the user settings, for example, based on a data export request by the central SG 2020 or independently, for example, before the LSG is powered down. On receiving the message in this situation, the receiver can, in an exemplary implementation, implicitly assume that the dirty flag was set beforehand, even if it has not received a dirty notification previously. Following successful export (acknowledgement from the remote station), the dirty flag can subsequently be erased in the SG.

Further, the LSGs may be designed to provide information about user settings supported by the LSGs, on which information the information about the supported user settings may be based. The central SG 2020 may be designed to retrieve the information about user settings supported by the LSGs.

The central SG (for example, the apparatus 10) may be designed to fetch the current local user settings from the LSGs when required (what is known as pull, requesting). By way of example, this is accomplished by virtue of the central SG requesting and locally storing for all LSGs an export of the setting values of the latter, from which setting values a dirty notification has been received since the last such export. The received dirty notifications stored in the central SG can then be removed. If a dirty notification has been obtained from an SG again up to the reception of the setting values from all LSGs, the algorithm can be performed again if need be.

The setting values can, in one exemplary implementation, be sent by the LSGs as a sorted key value list. This list can comprise all or a subset of those keys (as information about the supported user settings) that are retrievable from the LSGs as a key list. A possible detailed structure of the data format is described in FIGS. 3a and 3b.

Figure 3A:
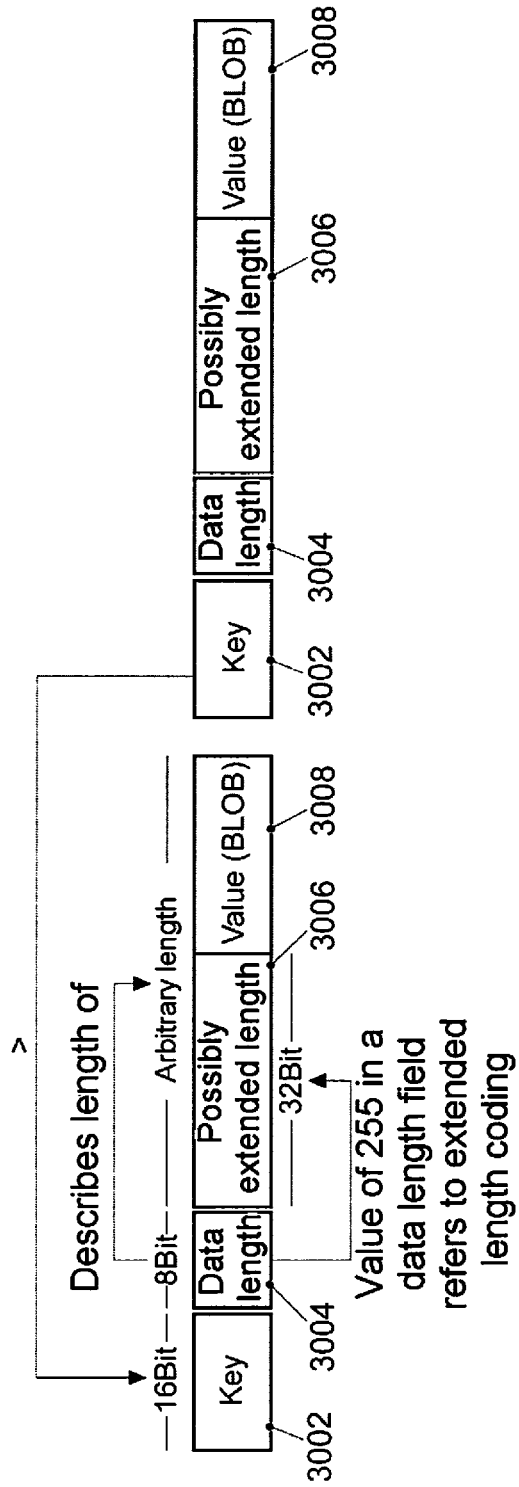
FIG. 3a illustrates an exemplary packet format for synchronization within a vehicle.

FIG. 3a shows an exemplary basic message format that may be suitable for allowing simple parsing/breakdown for the intermediate processing in the central SG 2020 or synchronization and storage in the backend without knowledge of the internal structure and meaning of the individual values. The exemplary format is implemented as a key value list and sorted according to the keys 3002, for example, in ascending order. By way of example, an 8-bit length field 3004 is used to indicate the data length of the value field 3008. If the length field 3004 is set to 255/0xFF, then it is possible, by way of example, to use an extended length field 3006 in the first 8 bits of the value field 3008.

Figure 3B:
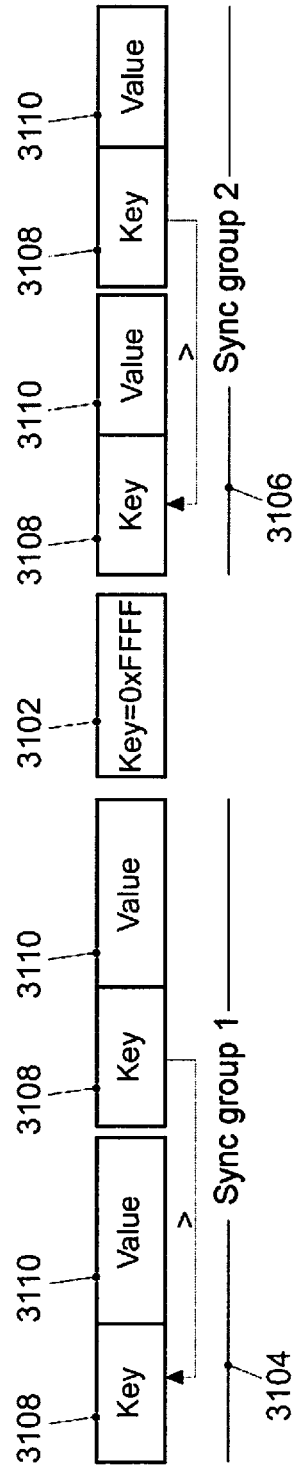
FIG. 3b illustrates a further exemplary packet format for synchronization within a vehicle.

FIG. 3b shows an extension of the exemplary basic message format to support multiple synchronization groups. Some values within an LSG may be quickly/frequently variable, for example, others less so. Synchronization to the backend on the basis of always complete data records from LSGs can result in the whole data record of these LSGs always being synchronized after each journey, for example, including the portions that have not altered (unnecessary volume of data). Examples of quickly/frequently variable settings are the active audio source, the currently activated infotainment function (infotainment: information and entertainment) or the volume of the infotainment function, for example. In the exemplary implementation from FIG. 3b, the local user settings in the data record of an LSG can be divided into groups. A specific key 3102 (for example, 0xFFFF) can be used as a separator between data of different synchronization groups 3104; 3106 (which comprise keys 3108 and values 3110). The central SG may be designed to split the data record at the separator and to synchronize these independently of one another to the backend (for example, with a separate alignment of the data words and key lists per synchronization group with the backend). The storage of the data in the backend and hash formation may be independent of the synchronization group, for example. Within a synchronization group, key value pairs may be sorted according to ascending keys, for example.

The central SG may be designed to use the setting values available to it to perform synchronization to the setting values in the backend, which can correspond to the second information system 200, for example, or can upload or download the setting values thereto or therefrom. This can be triggered automatically, for example, when the applicable timer runs out, which timer can be reset and started when a dirty notification is obtained. As a result, synchronization can be carried out automatically always at a defined time after the last change, for example. To this end, the procedure may be as follows:

The central SG 2020, which can correspond to the apparatus 10, may be designed to send a list of the keys per LSG to the control center, for example, the control center 2000, for example, as information about the supported user settings. The control center may be designed to use this to form a key value list having the same structure as is also used by the LSGs. To this end, in some exemplary embodiments, it accesses a database that stores the setting value under the LSG-ID and the key. Subsequently, the backend can form a hash as data words using this key value list in accordance with a defined method, for example, using the SHA256 method (Secure Hash Algorithm 256). The pairs comprising LSG-ID and hash can be sent back to the central SG in the vehicle, for example, together with the time of the last change to one of the remotely stored user settings comprised therein in the backend.

Using the request on the backend, the central SG in the vehicle may be designed to likewise compute a hash/data word using the key value lists of the LSGs in accordance with the same method, for example, by determining 110.

On obtaining (for example, by obtaining 134) the response from the backend, the central SG may be designed to compare the locally determined data words/hashes with the data words/hashes returned by the backend by virtue of the (for example, by comparing 136). It is thus possible to determine whether there are altered settings for an LSG or a synchronization group within an LSG.

As a result of the comparison of the times of the last change to the profile in the backend with the time, stored in the vehicle, of the last successful synchronization of the profile (see below) or as a result of further cited options for determining the direction of the synchronization, it is possible, in some exemplary embodiments, to determine whether and in what direction altered user settings need to be transmitted, for example, by synchronizing 140. The synchronization flag (for example, the information about the changed user settings) allows identification of conflicts arising from changes to the settings of an LSG both on the vehicle and in the backend since the last successful synchronization.

If a last change of the remotely stored user settings is before a time of the last synchronization of the vehicle, then the central SG 2020 may be designed to provide the local user settings of changed LSGs to the backend, for example, in the synchronizing 140. The method can, by way of example, involve/the central SG 2020 may be designed to provide a key value list for the LSGs for which the data words/hashes differ to the control center, for example, as providing 118 the information about the supported user settings. The backend may be designed to split these into individual values and to store them under the respective keys and LSG-IDs.

If the time of the last change of the remotely stored user settings in the backend is after a time of the last synchronization of the vehicle (or after the time of the last change of the local user settings), the central SG may be designed to load the altered settings from the backend, for example, to check whether there are conflicts by synchronizing 140.

If the synchronization flag is set, then the central SG 2020 may be designed to retrieve from the backend the key value list for all LSGs for which the hashes differ. If required, it may be designed to subsequently distribute the list to the LSGs further for the purpose of activation. In some exemplary embodiments, this can occur when the download for all LSGs has completed—in the interim, they can be temporarily stored in a buffer store.

If the synchronization flag is not set, there may be a conflict: the first information system, which can correspond to an information system of a vehicle, can ask the user for a decision, for example, using an output module and an input module, as to whether its local changes are to be uploaded or the alterations are to be adopted from the backend, and subsequently carry out the respective action. Alternatively or additionally, the conflict resolution can be determined in automated manner, for example, based on the times of the last changes, or conflict identification can be omitted.

Finally, the synchronization flag can be set and the timer (timekeeper) stopped. The current time can be stored as the time of the last successful synchronization of the profile.

In some exemplary embodiments, when there are modifications to the synchronization mechanism, the direction of transmission of the changes can be prescribed and data saving "loading" and "storage" of vehicle settings in the backend can be made possible, the direction of transmission thus being prescribed explicitly and not being determined automatically as with the synchronizing 140.

The pull and synchronization method described above can, by way of example, be used as follows to attain the most convenient synchronization of the settings possible:

When the synchronization is triggered manually, it is possible, if the synchronization flag has been erased, for the second data word to be obtained 134 and synchronized 140. When the timer runs out, it is possible, if automatic synchronization has been activated and the synchronization flag has been erased, for the second data word to be obtained 134 and synchronized 140. At the end of the journey, it is possible, if the synchronization flag has been erased, for the second data word to be obtained 134 and, if the automatic synchronization has been activated, synchronized 140. On vehicle activation (e.g., unlocking), it is possible, if the automatic synchronization has been activated, to synchronize.

The cycle is similar to that in some exemplary embodiments. On storage in the backend, the key value list for the LSGs for which the data words/hashes differ can be provided to the control center in this case, for example, as providing 118 the information about the supported user settings. The backend may be designed to split these into individual values and to store them under the respective keys and LSG-IDs. If the last change in the backend is after the time of the last synchronization of the vehicle, then an upload from the vehicle to the backend can be omitted in some exemplary embodiments. In the event of a conflict, conflict resolution can be omitted and the remotely stored user setting can be replaced by the local user setting or a user can be informed about the conflict, for example, via the output and output module, and asked for a decision.

During loading from the backend, it is possible, by way of example, for the key value list to be retrieved from the backend for all LSGs for which the hashes differ. If required, the central SG 2020 may be designed to subsequently distribute the list to the LSGs further for the purpose of activation. In some exemplary embodiments, this can occur when the download for all LSGs has completed—in the interim, they can be temporarily stored in a buffer store. If the last change in the backend is before a time of the last synchronization of the vehicle, then a download from the backend to the vehicle can be omitted in some exemplary embodiments. In the event of a conflict, conflict resolution can be omitted and the local user setting can be replaced by the remotely stored user setting or a user can be informed about the conflict, for example, via the output and output module, and asked for a decision.

Within the key value lists from an LSG, the latter can prescribe synchronization groups that are synchronized separately by the central SG, as though they came from different LSGs.

Exemplary embodiments provide a method that allows automatic synchronization and can increase convenience for the users. Use of synchronization groups may be useful to reduce the volume of data, even though it increases the complexity of the method.

A further exemplary embodiment is a computer program for performing at least one of the methods described above when the computer program runs on a computer, a processor or a programmable hardware component. A further exemplary embodiment is also a digital storage medium that is machine-readable or computer-readable and that has electronically readable control signals that can interact with a programmable hardware component such that one of the methods described above is carried out.

The features disclosed in the description above, the claims below and the enclosed figures can be of importance and implemented both individually and in any desired combination for the realization of an exemplary embodiment in its various refinements.

Although some embodiments have been described in connection with an apparatus, it goes without saying that these embodiments also represent a description of the corresponding method, such that a block or a component of an apparatus should also be understood as a corresponding method operation or as a feature of a method operation. Analogously to this, embodiments described in connection with or as a method operation also represent a description of a corresponding block or detail or feature of a corresponding apparatus.

Depending on specific implementation requirements, exemplary embodiments can be implemented in hardware or in software. The implementation can be carried out using a digital storage medium, for example, a floppy disk, a DVD, a Blu-Ray disc, a CD, a ROM, a PROM, an EPROM, an EEPROM or a FLASH memory, a hard disk or some other magnetic or optical storage device on which are stored electronically readable control signals that can interact or do interact with a programmable hardware component such that the respective method is performed.

A programmable hardware component can be formed by a processor, a central processing unit (CPU), a graphics processing unit (GPU), a computer, a computer system, an application-specific integrated circuit (ASIC), an integrated circuit (IC), a system on chip (SOC), a programmable logical element or a field programmable gate array having a microprocessor (FPGA).

The digital storage medium may therefore be machine-readable or computer-readable. Some exemplary embodiments thus comprise a data storage medium that has electronically readable control signals that are able to interact with a programmable computer system or a programmable hardware component such that one of the methods described herein is performed. At least one exemplary embodiment is therefore a data storage medium (or a digital storage medium or a computer-readable medium) on which the program for performing one of the methods described herein is recorded.

Generally, exemplary embodiments may be implemented as a program, firmware, computer program or computer program product comprising a program code or as data, wherein the program code or the data is or are operative to the effect of performing one of the methods when the program runs on a processor or a programmable hardware component. The program code or the data may, by way of example, also be stored on a machine-readable medium or data storage medium. The program code or the data may be present inter alia as source code, machine code or byte code and as other intermediate code.

A further exemplary embodiment is further a data stream, a signal train or a sequence of signals that represents or represent the program for performing one of the methods described herein. The data stream, the signal train or the sequence of signals may, by way of example, be configured to the effect of being transferred via a data communication link, for example, via the Internet or another network. Exemplary embodiments are thus also data-representing signal trains that are suitable for sending via a network or a data communication link, wherein the data represent the program.

A program according to at least one exemplary embodiment can implement one of the methods while it is being performed, for example, by reading memory locations or writing a datum or multiple data thereto, as a result of which, if appropriate, switching processes or other processes are brought about in transistor structures, in amplifier structures or in other electrical components, optical components, magnetic components or components that operate according to another functional principle. Accordingly, by means of a memory location being read, it is possible for data, values, sensor values or other information to be captured, determined or measured by a program. Therefore, by means of reading one or more memory locations, a program can capture, determine or measure variables, values, measured variables and other information and, by means of writing to one or more memory locations, the program can bring about, prompt or perform an action and actuate other devices, machines and components.

The exemplary embodiments described above are merely an illustration of the principles of the disclosed embodiments. It goes without saying that modifications and variations of the arrangements and details described herein will become apparent to other persons skilled in the art. Therefore, the intention is for the disclosed embodiments to be restricted only by the scope of the protection of the patent claims below, and not by the specific details presented herein on the basis of the description and the explanation of the exemplary embodiments.

LIST OF REFERENCE SYMBOLS 10 apparatus
12 interface
14 control module
100 first information system
102 obtaining information about a change of a user setting
104 obtaining a local user setting
110 determining a first data word
112 determining a time of a last change of a local user setting
114 obtaining information about supported user settings
116 determining information about supported user settings
118 providing information about supported user settings
120 providing the first data word
122 providing the first data word
130 establishing the up-to-dateness of the local user setting
132 obtaining a result of a comparison
134 obtaining a second data word
136 comparing the first data word and the second data word
140 synchronizing
142 providing the local user setting
1000 vehicle
2000 control center
2002; 2004; 2006 controllers
2002a; 2002b; 2004a; 2006a logic controllers
2010 communication bus
2020 central controller
3002 keys
3004 8-bit length field
3006 extended length field
3008 value field
3102 specific key/separator
3104; 3106 synchronization groups
3108 keys
3110 values.

The invention claimed is:

1. A method for a first information system in a transportation vehicle establishing an up-to-dateness of a local user setting, the method comprising:
determining a first data word based on the local user setting, wherein the first data word is representable with a smaller volume of data than the local user setting;
providing the first data word for comparison with a second data word of a remote second information system, wherein the second data word is based on a remotely stored user setting;
locally establishing the up-to-dateness of the local user setting if the first data word from the first information system matches the second data word from the second information system;
synchronizing the local user setting to the remotely stored user setting in response to the first data word not matching the second data word;
determining a time of a last change of the local user setting,
wherein the local user setting is representative of a plurality of local user settings in a synchronization group, and
wherein the synchronizing is based on a comparison of the time of the last change of the local user setting with a time of a last change of the remotely stored user setting.

2. The method of claim 1,
wherein the determining of the first data word comprises determining a mapping of the local user setting into a target space, wherein the first data word is comprised in the target space, or
wherein the determining of the first data word comprises computing a hash function using the local user setting, wherein the data word comprises a result of the computed hash function, or
wherein the determining of the first data word comprises computing a checksum using the local user setting, wherein the first data word comprises the checksum.

3. The method of claim 1,
wherein the providing comprises providing the first data word for the second information system, wherein the establishing further comprises obtaining a result of a comparison of the first data word and of the second data word from the second information system, or
wherein the establishing further comprises obtaining the second data word for the second information system and comprises comparing the first data word with the second data word.

4. The method of claim 1,
further comprising obtaining information about supported user settings for the second information system, wherein the providing is further based on the information about the supported user settings, or
further comprising determining information about supported user settings, and providing the information about the supported user settings for the second information system.

5. The method of claim 1, wherein the first information system corresponds to an information system of a transportation vehicle, wherein the transportation vehicle comprises at least one controller, and wherein the at least one controller comprises one or more local user settings, further comprising:
obtaining information about a change of the local user setting from the at least one controller;
obtaining the local user setting from the at least one controller in response to the information about the change of the local user setting indicating that the local user setting has been changed; and
providing the synchronized local user setting for the at least one controller,
wherein the determining, the providing and/or the establishing are based on the information about the change of the local user setting.

6. An apparatus for a first information system in a transportation vehicle establishing an up-to-dateness of a local user setting, the apparatus comprising:

a control module for:
  determining a first data word based on the local user setting, wherein the first data word is representable with a smaller volume of data than the local user setting,
  providing the first data word for comparison with a second data word of a remote second information system, wherein the second data word is based on a remotely stored user setting,
  locally establishing the up-to-dateness of the local user setting in response to the first data word the first information system matches the second data word from the second information system,
  synchronizing the local user setting to the remotely stored user setting in response to the first data word not matching the second data word, and
  determining a time of a last change of the local user setting,
  wherein the synchronizing is based on a comparison of the time of the last change of the local user setting with a time of a last change of the remotely stored user setting, and
  wherein the local user setting is representative of a plurality of local user settings in a synchronization group.

7. The apparatus of claim 6, wherein the determination of the first data word comprises determining a mapping of the local user setting into a target space, wherein the first data word is comprised in the target space, or wherein the determination of the first data word comprises computing a hash function using the local user setting, wherein the data word comprises a result of the computed hash function, or wherein the determination of the first data word comprises computing a checksum using the local user setting, wherein the first data word comprises the checksum.

8. The apparatus of claim 6, wherein the first data word is provided for the second information system, a result of a comparison of the first data word and of the second data word from the second information system is obtained, or the second data word for the second information system is obtained and compared with the first data word.

9. The apparatus of claim 6, wherein information is obtained about supported user settings for the second information system, wherein providing of the first word is further based on the information about the supported user settings, or information is determined about supported user settings, and the information about the supported user settings is provided for the second information system.

10. The apparatus of claim 6, wherein the first information system corresponds to an information system of a transportation vehicle, wherein the transportation vehicle comprises at least one controller, and wherein the at least one controller comprises one or more local user settings, wherein the information about a change of the local user setting is obtained from the at least one controller, the local user setting are obtained from the at least one controller in response to the information about the change of the local user setting indicating that the local user setting has been changed, and the synchronized local user setting are provided for the at least one controller, wherein the determining, the providing and/or the establishing are based on the information about the change of the local user setting.

11. A transportation vehicle comprising:
  an apparatus for a first information system in the transportation vehicle establishing an up-to-dateness of a local user setting for the transportation vehicle, the apparatus including a control module to determine a first data word based on the local user setting for the transportation vehicle,
  wherein the first data word is representable with a smaller volume of data than the local user setting for the transportation vehicle, to provide the first data word for comparison with a second data word of a remote, second information system at a control center,
  wherein the second data word is based on a remotely stored user setting at the second information system, to locally establish the up-to-dateness of the local user setting for the transportation vehicle in response to the first data word the first information system matching the second data word from the second information system,
  wherein the apparatus synchronizes the local user setting to the remotely stored user setting in response to the first data word not matching the second data word and determines a time of a last change of the local user setting,
  wherein the synchronizing is based on a comparison of the time of the last change of the local user setting with a time of a last change of the remotely stored user setting, and
  wherein the local user setting is representative of a plurality of user settings in a synchronization group.

12. The transportation vehicle of claim 11, wherein the determination of the first data word comprises determining a mapping of the local user setting into a target space, wherein the first data word is comprised in the target space, or wherein the determination of the first data word comprises computing a hash function using the local user setting, wherein the data word comprises a result of the computed hash function, or wherein the determination of the first data word comprises computing a checksum using the local user setting, wherein the first data word comprises the checksum.

13. The transportation vehicle of claim 11, wherein the first data word is provided for the second information system, a result of a comparison of the first data word and of the second data word from the second information system is obtained, or the second data word for the second information system is obtained and compared with the first data word.

14. The transportation vehicle of claim 11, wherein information is obtained about supported user settings for the second information system, wherein providing of the first word is further based on the information about the supported user settings, or information is determined about supported user settings, and the information about the supported user settings is provided for the second information system.

15. The transportation vehicle of claim 11, wherein the first information system corresponds to an information system of the transportation vehicle, wherein the transportation vehicle comprises at least one controller, and wherein the at least one controller comprises one or more local user settings, wherein the information about a change of the local user setting is obtained from the at least one controller, the local user setting are obtained from the at least one controller in response to the information about the change of the local user setting indicating that the local user setting has been changed, and the synchronized local user setting are provided for the at least one controller, wherein the determining, the providing and/or the establishing are based on the information about the change of the local user setting.

16. A control center comprising:
  a control center information system that communicates with an apparatus for a first information system in a transportation vehicle establishing an up-to-dateness of a local user setting for the transportation vehicle, the apparatus including a control module to determine a first data word based on the local user setting for the transportation vehicle, wherein the first data word is representable with a smaller volume of data than the local user setting for the transportation vehicle, to provide the first data word for comparison with a second data word of control center information system, wherein the second data word is based on a remotely stored user setting at the remote second information system, to locally establish the up-to-dateness of the local user setting for the transportation vehicle in response to the first data word the first information system matching the second data word from the second information system, wherein the apparatus synchronizes the local user setting to the remotely stored user setting in response to the first data word not matching the second data word, wherein the apparatus determines a time of a last change of the local user setting, wherein the synchronizing is based on a comparison of the time of the last change of the local user setting with a time of a last change of the remotely stored user setting, and wherein the local user setting is representative of a plurality of user settings in a synchronization group.

17. The control center of claim 16, wherein the determination of the first data word comprises determining a mapping of the local user setting into a target space, wherein the first data word is comprised in the target space, or wherein the determination of the first data word comprises computing a hash function using the local user setting, wherein the data word comprises a result of the computed hash function, or wherein the determination of the first data word comprises computing a checksum using the local user setting, wherein the first data word comprises the checksum.

18. The control center of claim 16, wherein the first data word is provided for the second information system, a result of a comparison of the first data word and of the second data word from the second information system is obtained, or the second data word for the second information system is obtained and compared with the first data word.

19. The control center of claim 16, wherein information is obtained about supported user settings for the second information system, wherein providing of the first word is further based on the information about the supported user settings, or information is determined about supported user settings, and the information about the supported user settings is provided for the second information system.

20. The control center of claim 16, wherein the first information system corresponds to an information system of a transportation vehicle, wherein the transportation vehicle comprises at least one controller, and wherein the at least one controller comprises one or more local user settings, wherein the information about a change of the local user setting is obtained from the at least one controller, the local user setting are obtained from the at least one controller in response to the information about the change of the local user setting indicating that the local user setting has been changed, and the synchronized local user setting are provided for the at least one controller, wherein the determining, the providing and/or the establishing are based on the information about the change of the local user setting.

* * * * *